United States Patent [19]
Shimizu et al.

[11] Patent Number: 5,794,915
[45] Date of Patent: Aug. 18, 1998

[54] SAFETY RELIEF VALVE ASSEMBLY FOR A FLUID DISPLACEMENT APPARATUS

[75] Inventors: Hidehiko Shimizu, Sawa-gun; Masashi Yaguchi, Takasaki, both of Japan

[73] Assignee: Sanden Corporation, Gunma, Japan

[21] Appl. No.: 762,732

[22] Filed: Dec. 10, 1996

[30] Foreign Application Priority Data

Dec. 13, 1995 [JP] Japan .................... 7-346646

[51] Int. Cl.$^6$ .................... F16K 47/00
[52] U.S. Cl. .................... 251/127; 137/540; 251/118; 417/306
[58] Field of Search .................... 251/127, 120, 251/118; 137/540; 417/306, 307; 138/37, 39

[56] References Cited

U.S. PATENT DOCUMENTS

| 723,698 | 3/1903 | Marsh | 251/120 |
|---|---|---|---|
| 851,370 | 4/1907 | Nolan | 251/120 |
| 1,892,649 | 12/1932 | Buenger | 138/37 |
| 2,046,228 | 6/1936 | Wiedmann | 251/118 |
| 2,129,958 | 9/1938 | Podolsky | 251/127 |
| 2,655,170 | 10/1953 | Ferguson | 251/118 |
| 3,131,717 | 5/1964 | Gratzmuller | 251/127 |
| 4,335,744 | 6/1982 | Bey | 251/127 |
| 4,577,835 | 3/1986 | Holycross | 251/118 |
| 4,719,938 | 1/1988 | Pandorf | 137/516.27 |
| 4,738,595 | 4/1988 | Gaiser | 417/307 |
| 4,799,359 | 1/1989 | Nicoll | 137/540 |
| 4,932,428 | 6/1990 | Planchard | 137/540 |
| 5,390,993 | 2/1995 | Beck et al. | |
| 5,472,318 | 12/1995 | Frank | 417/306 |

FOREIGN PATENT DOCUMENTS 4-84976  4/1992  Japan .

OTHER PUBLICATIONS

International Search Report completed on Jan. 27, 1998.

*Primary Examiner*—Denise L. Ferensic
*Assistant Examiner*—Ramyar Farid
*Attorney, Agent, or Firm*—Baker & Botts, L.L.P.

[57] ABSTRACT

A safety relief valve assembly for use in a fluid displacement apparatus of an automotive air conditioning system includes a valve mechanism which releases gas when the pressure in the fluid displacement apparatus increases above a predetermined pressure level. A control device is detachably mounted on the valve mechanism to direct the flow of the gas in a predetermined direction. An elastic member is forcibly disposed between the valve mechanism and the control device. The elastic member has a groove facing the valve mechanism. The groove and the valve mechanism collectively form a passage for directing excessively pressurized gas away from the hot components in the vehicle engine compartment.

12 Claims, 4 Drawing Sheets

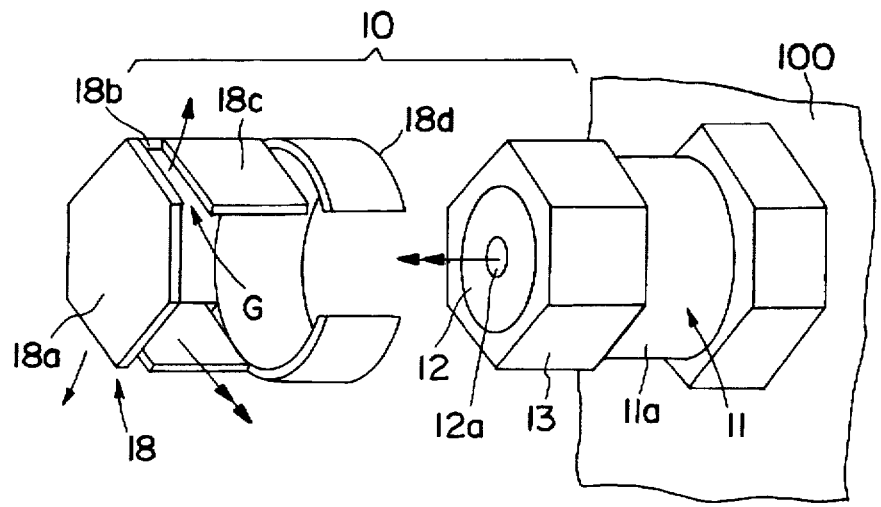
F I G. 1
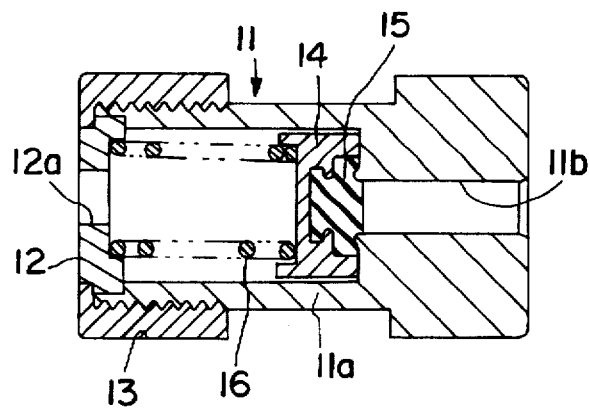
F I G. 2
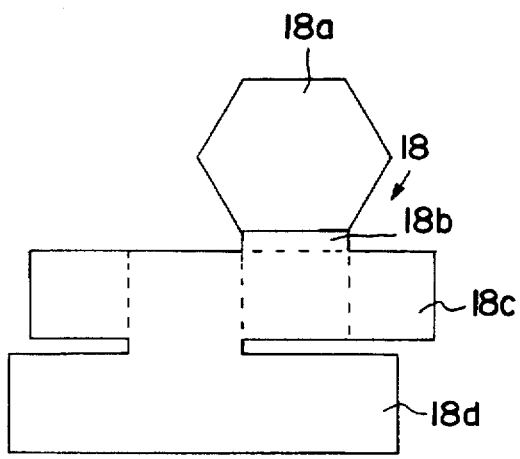
F I G. 3

SAFETY RELIEF VALVE ASSEMBLY FOR A FLUID DISPLACEMENT APPARATUS

BACKGROUND OF THE INVENTION

1. Field of the Invention

The present invention relates to a safety relief valve assembly for a fluid displacement apparatus and, more particularly, to a safety relief valve assembly for a refrigerant compressor used in an automotive air conditioning system.

2. Description of the Related Art

Many safety relief valves for refrigerant compressor applications are well known in the prior art. For example, Japanese Utility Publication No. H04-84976 discloses a safety relief valve device generally used in a refrigerant compressor for an automotive air conditioning system. The refrigerant compressor is provided with a safety relief valve device which automatically prevents excessive pressure build up in the compressor. The safety relief valve, which is mounted on the compressor housing, opens and closes in response to the pressure in the compressor if the pressure in the compressor or the cooling circuit abnormally increases.

When the safety relief valve operates, refrigerant gas including lubricating oil is emitted in the engine compartment of the vehicle. If the emission strikes a high temperature component of the engine, such as an exhaust manifold, smoke along with offensive odors and sometimes even fire result.

One attempt to resolve this problem was derived by the assignee of this application. Though not prior art, this attempt is indicative of the prior shortcomings of earlier solutions. Referring to FIGS. 1–3, relief valve assembly 10 includes valve mechanism 11 mounted on one end of a refrigerant compressor 100 and a cover member 18 attached to valve body 11a of valve mechanism 11. Valve mechanism 11 includes valve packing 15, valve member 14 surrounding valve packing 15, nut 13 disposed on the edge of valve body 11a, cap member 12 and spring 16 disposed between valve member 14 and cap member 12. Cap member 12 includes an opening 12a formed at the center radial axis thereof Spring 16 biases valve member 14 and valve packing 15 toward the open end of passage 11b formed in the center of valve body 11a.

Cover member 18 comprises a hexagonal plate portion 18a, a connecting portion 18b perpendicularly extending from one end of hexagonal plate portion 18b, arm portion 18c extending from connecting portion 18b and a ring portion 18d extending from one end of arm portion 18c. Cover member 18 is secured to valve mechanism 11 such that arm portion 18c and ring portion 18d respectively hold nut 13 and valve body 11a, and hexagonal plate portion 18a faces opening 12a of cap member 12.

Cover member 18 is manufactured by blanking a plane plate and bending hexagonal plate portion 18a towards arm portion 18c at a 90° angle as shown in FIG. 3. Cover member 18 is provided with connecting portion 18b which eases the bending of hexagonal plate portion 18a. Gap G (FIG. 1) is created between hexagonal plate portion 18a and arm portion 18c.

When the pressure in the cooling circuit and the compressor exceeds predetermined design pressures, the high pressure refrigerant gas causes valve member 14 and valve packing 15 to move away from the valve seat by overcoming the restoring force of coil spring 16. Refrigerant gas is then emitted in the direction of the longitudinal axis of valve body 11a through opening 12a of cap member 12. Thus, the refrigerant gas strikes and is directed along hexagonal plate portion 18a toward an area other than the high temperature components of the engine, for instance below compressor 100. When the pressure in the cooling circuit and the compressor decreases, valve member 14 and valve packing 15 return to the valve seat under the influence of the restoring force of coil spring 16.

Even in this configuration, however, it has been experienced that some of the refrigerant gas comes into contact with the high temperature components of the engine due to the presence of gap G. Thus, the problem has not been totally solved, and there remains the possibility of causing smoke or an offensive odor or even fire from the engine compartment of the vehicle.

These and other drawbacks are sought to be overcome by the invention of the referred embodiments.

SUMMARY OF THE INVENTION

It is an object of the present invention to provide a safety relief valve assembly for use in a refrigerant compressor of an automotive air conditioning system wherein the refrigerant gas emitted from the relief valve assembly is directed in a predetermined direction without coming into contact with the high temperature components of the engine.

According to the present invention, a safety relief valve assembly for use in a refrigerant compressor comprises a valve mechanism which is connected to the compressor housing. The relief valve releases excessive refrigerant gas from the refrigerant compressor when the pressure in the refrigerant compressor exceeds a predetermined level. The valve mechanism includes a valve body which has an inlet port connected to the housing of the refrigerant compressor. At least one relief port discharges excessive refrigerant gas therethrough. A projection portion extends from a periphery of the relief valve. A valve member is movably disposed in the valve body to open and close the relief port. A biasing means urges the valve member to close the relief port whenever the pressure in the valve body is below the predetermined safe pressure level. A control device is detachably mounted on the valve body and covers the relief port. The control device directs the flow of the excessive refrigerant gas toward a predetermined design direction.

An elastic member is forcibly disposed between the valve body and the control device. The elastic member includes a groove facing the relief port of the valve body such that the groove and the valve body collectively form a passage for directing the excessive refrigerant gas.

Further objects, features and other aspects of the present invention will be understood from the detailed description of the preferred embodiment of the present invention with reference to the annexed drawings.

BRIEF DESCRIPTION OF THE DRAWINGS

FIG. 1 is a perspective view of a safety relief valve assembly connected to a fluid displacement apparatus in accordance with one embodiment.

FIG. 2 is an enlarged sectional view of a valve body of the safety relief valve assembly of FIG. 1.

FIG. 3 is a plan view of a cover member of the safety relief valve assembly of FIG. 1.

DETAILED DESCRIPTION OF THE DRAWINGS

Figure 4:
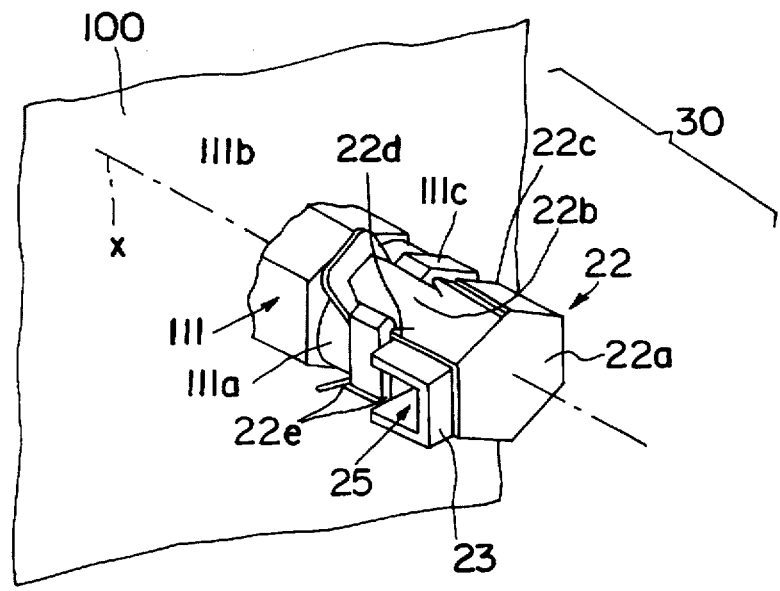
FIG. 4 is a perspective view of a safety relief valve assembly connected to a fluid displacement apparatus in accordance with a first preferred embodiment of the present invention.
Figure 5:
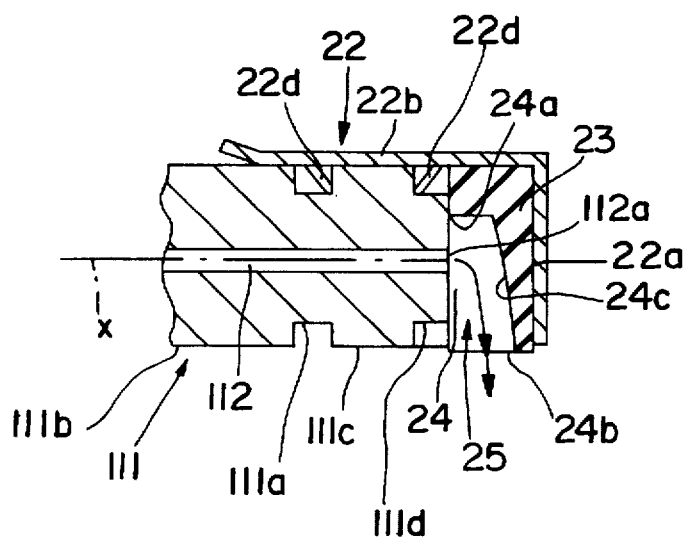
FIG. 5 is an enlarged sectional view of the safety relief valve assembly of FIG. 4.

With reference to FIGS. 4 and 5, a safety relief valve assembly 30 connected to a refrigerant compressor 100 according to a first preferred embodiment of the present invention is shown. Safety relief valve assembly 30 comprises a valve mechanism connected to a relief port (not shown) of a compressor 100 and a cover member 22 fitted to valve mechanism 111. Valve mechanism 111 includes a first cylinder portion 111a formed in the center thereof, a first hexagonal shaft 111b formed on one side of first cylinder portion 111a, a second hexagonal shaft 111c formed on the other side of first cylinder portion 111a, and a second cylinder portion 111d extending from second hexagonal shaft 111c. Valve mechanism 111 further includes a passage 112 formed through the center longitudinal axis thereof Passage 112 extends from first hexagonal shaft 111b to the end of second cylindrical portion 111d. Valve mechanism 111 is secured to one end surface of compressor 100. The center axis X of valve mechanism 111 is perpendicular to the surface of compressor 100.

Figure 6:
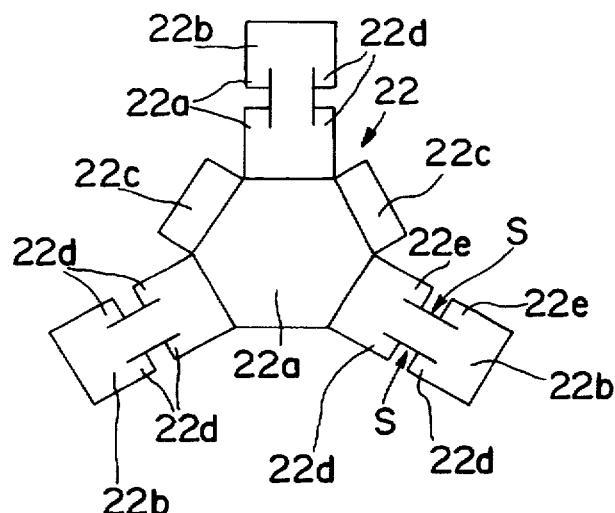
FIG. 6 is a plan view of a cover member of the safety relief valve assembly of FIG. 4.

With reference to FIG. 6 in conjunction with FIGS. 4 and 5, cover member 22 includes a hexagonal plate 22a, three arm plates 22b perpendicularly extending from alternate edges of hexagonal plate 22a and a pair of square plates 22c perpendicularly extending from two of the remaining edges of hexagonal plate 22a. Each arm plate 22b comprises a pair of first nail portions 22d and a pair of second nail portions 22e formed at the center of each arm plate 22b. Cover member 22 is produced by blanking a plane plate, which is preferably made of steel or resin, and bending three arm plates 22b and square plates 22c 90° along the edges of hexagonal plate 22a. First nail portions 22d and second nail portions 22e are produced by making a slit S in the center of each arm plate 22b and by bending nail portions 22d, 22e to arm plate 22b at an angle smaller than 45°. At best seen in FIG. 5, cover member 22 is secured to valve mechanism 111 such that first and second nail portions 22d, 22e respectively engage second hexagonal shaft 111c.

Figure 7:
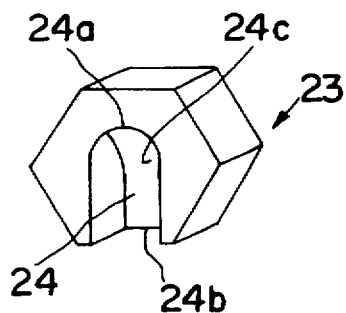
FIG. 7 is a perspective view of an elastic member of the safety relief valve assembly of FIG. 4.

Referring to FIG. 7, hexagonal elastic member 23, which is preferably made of soft resin or rubber, is compressively inserted between second cylindrical portion 111d and cover member 22 to face passage 112. Hexagonal elastic member 23 includes a groove 24 formed at one end surface thereof.

Groove 24 extends from position 24a near one edge thereof to opposite side edge 24b. Hexagonal elastic member 23 includes sloped bottom portion 24c whose depth increases with distance from position 24a. Groove 24 and the end surface of first hexagonal shaft 111b collectively form a passageway 25 through which excessively pressurized gas is discharged.

In operation, when the pressure in the cooling circuit (not shown) and compressor 100 increase and exceeds a predetermined pressure level, safety relief valve assembly 30 operates to reduce the pressure. The high pressure fluid gas discharged from compressor 100 through passage 112 blows toward a specified design direction as a result of being directed through passageway 25.

Accordingly, substantially all of the excessive gas, which includes lubricating oil discharged from compressor 100, may be directed away from the hot components in the vehicle engine compartment, since groove 24 of hexagonal elastic member 23 seals the gaps created between arm plates 22b and square plate 22c. Further, the high pressure gas more smoothly flows through passageway 25 in comparison with relief valve assembly 10 of the embodiment of FIG. 1 since the bottom portion 24c of groove 24 is tapered. Furthermore, the direction of the gas emitted from valve mechanism 111 can be selectively changed since first and second nail portions 22d, 22e detachably take hold of a radial end of second hexagonal shaft 111c.

Figure 8:
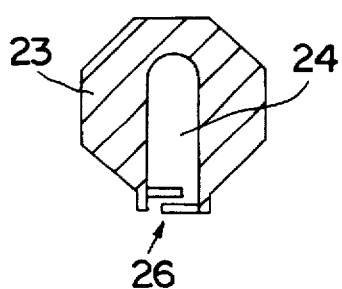
FIG. 8 is an enlarged sectional view of an elastic member of the safety relief valve assembly in accordance with a second preferred embodiment of the present invention.
Figure 9:
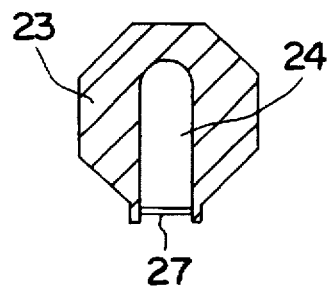
FIG. 9 is an enlarged sectional view of an elastic member of the safety relief valve assembly in accordance with a third preferred embodiment of the present invention.
Figure 10:
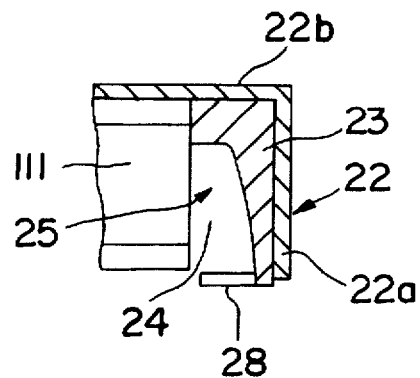
FIG. 10 is an enlarged sectional view of an elastic member of the safety relief valve assembly in accordance with a fourth preferred embodiment of the present invention.

FIGS. 8–10 illustrate second through fourth embodiments of the present invention. The safety relief valve assemblies of these additional embodiments are generally similar to the safety relief valve assembly 30 described above. However, some differences do exist as follows. In one alternative embodiment, labyrinth packing 26, which is made of rubber, or soft resin, is disposed on the side edge of groove 24 (shown in FIG. 8) in order to shade passageway 25. Alternatively, a thin plate 27, which is made of rubber or soft resin and designed to break if gas is emitted, is disposed on the side edge of groove 24 (shown in FIG. 9) in order to shade passageway 25. In another alternative embodiment, a cantilever plate 28, which hingedly opens passage 25 if excessively pressurized gas is emitted and closes the same after the gas has been emitted, is disposed on the side edge of groove 24 (shown in FIG. 10) in order to shade passageway 25. High pressure gas discharged from compressor 100 through passage 112 of valve body 111 is directed to the engine compartment through labyrinth 26, or after breaking thin plate 27, or after opening cantilever plate 28.

The advantages realized by the embodiments of FIGS. 8–10 are substantially similar to those obtained in the first embodiment. Furthermore, labyrinth 26, thin plate 27 and cantilever plate 28 prevent debris from obstructing passageway 25.

Figure 11:
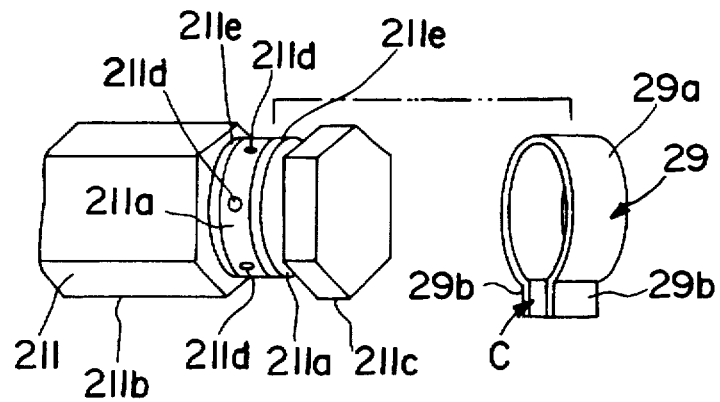
FIG. 11 is a perspective view of a safety relief valve assembly connected to a fluid displacement apparatus in accordance with a fifth preferred embodiment of the present invention.
Figure 12:
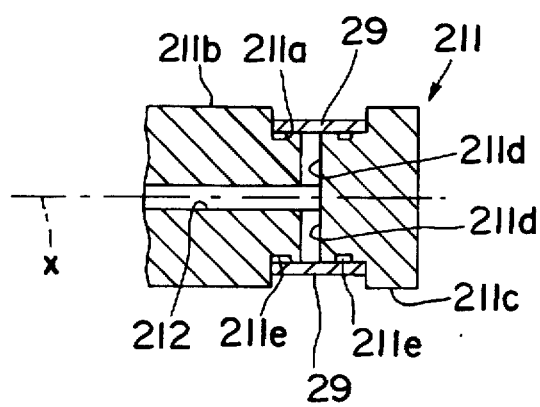
FIG. 12 is an enlarged sectional view of the safety relief valve assembly in accordance with FIG. 11.

FIG. 11 illustrates a fifth preferred embodiment of the present invention. The safety relief valve assembly is generally similar to the safety relief valve assembly described above. However, some difference do exists as follows. Valve mechanism 211 includes a cylinder portion 211a formed at the center thereof, a first hexagonal shaft 211b formed at one end of cylinder portion 211a and a second hexagonal shaft 211c formed the other end of cylinder portion 211a. Valve mechanism 211 includes a plurality of holes 211d annularly formed on the periphery of cylinder portion 211a at equal intervals. Holes 211d communicate with passage 212 formed along the center axis of valve mechanism 211. Cylinder portion 211a includes a pair of annular grooves 211e on either side of holes 211d. Cover member 29 includes a ring portion 29a and preferably includes a pair of flanges 29b extending from both ends of ring portion 29a. Cover member 29 is fitted on valve mechanism 211. More specifically, ring portion 29a is mounted on cylinder portion 211a and shades holes 211d. A gap C is formed between flanges 29b. At least one hole 211d is exposed between flanges 29b. Substantially the same advantages are obtained as in the first preferred embodiment. Furthermore, the fifth embodiment allows the direction of the high pressure gas discharged from compressor 200 to be selectively altered since the position of gap C can be changed by rotating ring portion 29a around cylindrical portion 211a.

Although the present invention has been described in connection with the preferred embodiments, the invention is not limited thereto. It will be easily understood by those of ordinary skill in the art that variations and modifications can be easily made within the scope of the invention as defined by the appended claims.

We claim:

1. A safety relief valve assembly for use in a fluid displacement apparatus having a housing, said assembly comprising;
   a valve mechanism, including at least one relief port connected to said housing, for releasing a gas from said fluid displacement apparatus when the pressure in said fluid displacement apparatus exceeds a predetermined pressure level;
   a control means detachably mounted on said valve mechanism so as to cover said relief port and to direct the flow of the gas toward a predetermined design direction; and
   an elastic member forcibly disposed between said valve mechanism and said control means, and having a groove facing said relief port, said groove and said valve mechanism collectively forming a passage for directing the gas.

2. The safety relief valve assembly of claim 1, said groove includes a sloped radial cross section whose depth increases with radial distance from said relief port.

3. The safety relief valve assembly of claim 1, wherein said elastic member includes a labyrinth packing disposed on an edge of said groove for shading said passage.

4. The safety relief valve assembly of claim 1, wherein said elastic member includes a thin plate member disposed on an edge of said groove for shading said passage.

5. The safety relief valve assembly of claim 1, wherein said elastic member includes a cantilever plate member disposed on an edge of said groove for shading said passage.

6. The safety relief valve assembly of claim 1, said control means comprising a plate member facing said relief port and having a plurality of arms extending from edges of said plate member, said arms releasably engaging said valve mechanism.

7. A relief valve assembly for use in a refrigerant compressor of an automobile air conditioning system, said compressor having a housing, said assembly comprising;
   a valve mechanism connected to said housing for releasing gas from said refrigerant compressor when the operating pressure of said compressor exceeds a predetermined pressure level, said valve mechanism including a valve body having an inlet port connected to said housing and at least one relief port for discharging excessive refrigerant gas pressure, a valve member movable in said valve body to open and close said relief port, and biasing means for moving said valve member to close said relief port whenever the pressure in said valve body is below said predetermined pressure level;
   control means, detachably mounted on said valve body so as to cover said relief port and to direct the flow of gas toward a predetermined design direction; and
   an elastic member forcibly disposed between said valve body and said control means, said elastic member including a groove facing said relief port, said groove and said valve mechanism collectively forming a passage for directing the gases.

8. The safety relief valve assembly of claim 7, wherein said groove includes a radial cross section whose depth increases with radial distance from said relief port.

9. The safety relief valve assembly of claim 7, wherein said elastic member includes a labyrinth packing disposed on an edge of said groove for shading said passage.

10. The safety relief valve assembly of claim 7, wherein said elastic member includes a thin plate member disposed on an edge of said groove for shading said passage.

11. The safety relief valve assembly of claim 7, wherein said elastic member includes a cantilever plate member disposed on an edge of said groove for shading said passage.

12. The safety relief valve assembly of claim 7, wherein said control means includes a plate member and a plurality of arms extending from edges of said plate member, said arms releasably engaging said valve body.

* * * * *